(12) United States Patent
Kato et al.

(10) Patent No.: US 6,751,321 B1
(45) Date of Patent: Jun. 15, 2004

(54) DIGITAL DATA REPRODUCTION DEVICE

(75) Inventors: Takehisa Kato, Yokohama; Naoki Endoh, Tokyo; Kenji Shimoda, Yokohama, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/064,985

(22) Filed: Apr. 23, 1998

(30) Foreign Application Priority Data

Apr. 24, 1997 (JP) .............................................. 9-107541

(51) Int. Cl.[7] .............................. H04L 9/00; H01R 11/00
(52) U.S. Cl. ............................ 380/201; 380/52; 380/59; 427/773
(58) Field of Search ......................................... 380/201

(56) References Cited

U.S. PATENT DOCUMENTS

| | | | | |
|---|---|---|---|---|
| 5,592,556 A | * | 1/1997 | Schwed ........................ | 380/49 |
| 5,602,920 A | * | 2/1997 | Bestler et al. ................. | 380/49 |
| 5,652,903 A | * | 7/1997 | Weng et al. ................. | 395/800 |
| 5,872,784 A | * | 2/1999 | Rostoker et al. ............. | 370/395 |
| 5,977,997 A | * | 11/1999 | Vansencher .................. | 345/519 |
| 5,991,403 A | * | 11/1999 | Aucsmith et al. ............. | 380/10 |

OTHER PUBLICATIONS

Computer Dictionary, Microsoft Press, Third Edition, 1997, pp. 68 and 428.*

Merriam Webster's Collegiate Dictionary, tenth edition 2001, page 154.*

* cited by examiner

Primary Examiner—Ayaz Sheikh
Assistant Examiner—Taghi T Arani
(74) Attorney, Agent, or Firm—Finnegan, Henderson, Farabow, Garrett & Dunner, L.L.P.

(57) ABSTRACT

A source of MPEG2 video data is connected with a dedicated AV device or personal computer by means of an IEEE 1394 interface. A transmission unit in the source has an IEEE 1394 encryption unit and a sending I/F unit. A reception unit varies between the dedicated AV unit and the personal computer. In the reception unit of the dedicated AV device, a receiving I/F unit and a decryptor are integrally incorporated into one semiconductor chip and an MPEG2 decoder is incorporated into one semiconductor chip. In the reception unit of the personal computer, the receiving I/F unit is formed of one semiconductor chip, and the decryptor connected to the I/F unit through a bus, and the MPEG2 decoder are formed of one semiconductor chip. Thus, data before decryption will not appear on the bus, which prevents MPEG2 video data from being taken out of the computer for illegal copying purposes. In addition, the reception unit is made to have a different physical configuration depending on whether it is to be mounted in the dedicated AV device or the personal computer. This will prevent the reception unit (including the decryptor) of the dedicated AV device from being connected in the personal computer in place of its associated reception unit (excluding the decryptor).

18 Claims, 3 Drawing Sheets

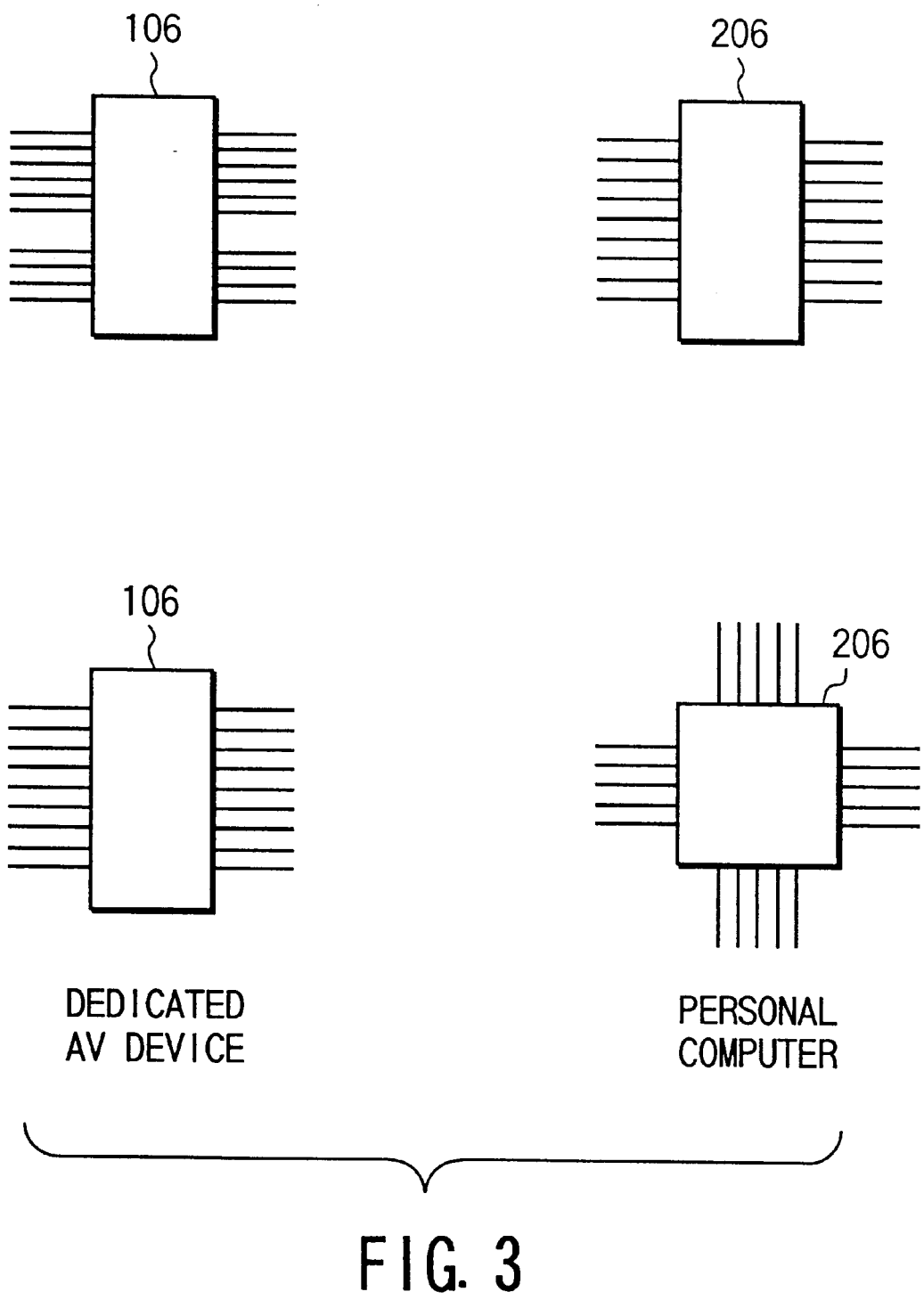

DIGITAL DATA REPRODUCTION DEVICE

BACKGROUND OF THE INVENTION

The present invention relates to a digital data reproduction device which receives and decrypts encrypted digital data to reproduce the original digital data and more particularly to a reproduction device which prevents unauthorized copying of data.

This application is based on Japanese Patent Application No. 9-107541, filed Apr. 24, 1997, the content of which is incorporated herein by reference.

In recent years, networking of digital devices has advanced as multimedia applications have evolved. That is, the transmission of digital data is increasingly being made not only between general-purpose computers, such as personal computers, but also between dedicated AV units, such as audio-visual equipment, or between a dedicated AV unit and a general-purpose computer. As one of digital interface standards that allow the transmission of digital data between a computer and a dedicated AV unit, an IEEE standard, IEEE 1394, was established recently.

However, the use of this standard to receive and decrypt encrypted multimedia data with a general-purpose computer causes a problem that unauthorized copies of digital data can be produced readily. The unauthorized copy, which is produced by digital processing, suffers from no degradation in picture quality and sound quality, allowing high picture quality duplications (so-called pirated editions) and leading to an infringement of copyrights. The dedicated AV unit is constructed such that multimedia data obtained by decrypting encrypted data cannot be taken out until it is converted by a digital-to-analog converter into analog form. That is, the decryptor, the D/A converter and the decoder (including an expansion decoder when data has been subjected to compressed encoding) are formed integrally and the decrypted data or decoded original digital data cannot be taken out from any intermediate stage. However, with general-purpose computers in which data is transferred over a bus for processing and hence decrypted digital data is also transferred over the bus, software can be used to control the personal computer so that the decrypted digital data can be taken out of the computer through the bus, thereby allowing the digital data to be copied.

BRIEF SUMMARY OF THE INVENTION

Accordingly, it is an object of the present invention to provide a digital data reproduction device which receives and decrypts encrypted digital data to reproduce the original digital data, but is arranged to prevent the digital data from being copied.

According to the present invention there is provided a digital recording/reproduction system comprising a transmit device for sending encrypted data; a receive device for receiving and decrypting the encrypted data sent from the transmit device and outputting decrypted data; and connection means for connecting the transmit device and the receive device together by means of an interface that conforms to an established standard with which a dedicated audiovisual digital device and a general-purpose digital device are compatible, in which the receive device comprises receiving interface means that has a different configuration depending on whether the receive device is the dedicated audio-visual digital device or the general-purpose digital device.

According to the present invention there is provided a recording/reproducing method for a digital recording/reproduction system comprising a transmit device for sending encrypted data; a receive device for receiving and decrypting the encrypted data sent from the transmit device and outputting decrypted data; and connection means for connecting the transmit device and the receive device together by means of an interface that conforms to an established standard with which a dedicated audio-visual digital device and a general-purpose digital device are compatible, in which the receive device comprises receiving interface means that has a different configuration depending on whether the receive device is the dedicated audio-visual digital device or the general-purpose digital device, the method allowing proper data transmission between the transmit device and the receive device only when the receiving interface means is mounted in the corresponding digital device.

According to the present invention there is provided a semiconductor receiver device used for a receive device which is connected with a transmit device that transmits encrypted data over connection means based on a predetermined interface and decrypts the encrypted data sent from the transmit device over the connection means, the predetermined interface conforming to an established standard with which a dedicated audio-visual digital device and a general-purpose digital device comprising a computer comprising a software-controllable bus are compatible, the semiconductor receiver device comprising receiving I/F means comprising a different configuration according to whether the receive device corresponds to the dedicated audio-visual digital device or the general-purpose digital device.

According to the present invention there is provided a receive device connected with a transmit device which provides encrypted data, comprising a central processing unit; a bus connected to the central processing unit; a receiving unit connected to the bus and comprising interface means; and a processor unit connected to the bus and comprising decryption means for receiving encrypted data from the transmit device over the bus and decrypting the encrypted data to provide decrypted data and conversion means for converting the decrypted data into an analog signal, data transmission between the decryption means and the conversion means being made without the use of the bus.

According to the present invention there is provided another receive device connected to a transmit device which provides encrypted data, comprising interface means for receiving the encrypted data; decryption means for decrypting encrypted data received by the interface means to provide decrypted data; and conversion means for converting the decrypted data provided by the decryption means into an analog signal, in which at least the interface means and the decryption means being integrally incorporated into one semiconductor chip.

According to the present invention there is provided a digital recording/reproduction system comprising a transmit device for transmitting encrypted data; dedicated data reproduction device; a general-purpose data reproduction device comprising a computer; and connection means for connecting the transmit device to the dedicated data reproduction device or the general-purpose data reproduction device by means of a predetermined interface which conforms to an established standard with which the dedicated data reproduction device and the general-purpose data reproduction device are compatible, in which the dedicated data reproduction device comprises interface means for receiving the encrypted data; decryption means for decrypting the encrypted data received by the interface means to provide decrypted data; and conversion means for converting the decrypted data provided by the decryption means into an analog signal, at least the interface means and the decryption means are integrally incorporated into a first semiconductor chip, and the general-purpose data reproduction device comprises a central processing unit; a bus connected to the central processing unit; a receiving unit connected to the bus and comprising interface means, the receiving unit being formed of a second semiconductor chip which is not compatible with the first semiconductor chip; and a processor unit connected to the bus and comprising decryption means for receiving the encrypted data from the transmit device over the bus and decrypting the encrypted data to provide decrypted data, and conversion means for converting the decrypted data into an analog signal, data transmission between the decryption means and the conversion means being made without the use of the bus.

According to the digital data reproduction device of the present invention, data after decryption is not transferred over the bus of a personal computer, thus preventing decrypted data from being taken out of the computer for copying purposes.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 3 shows configurations of semiconductor chips that form the receiving units shown in FIGS. 1 and 2.

DETAILED DESCRIPTION OF THE INVENTION

Figure 1:
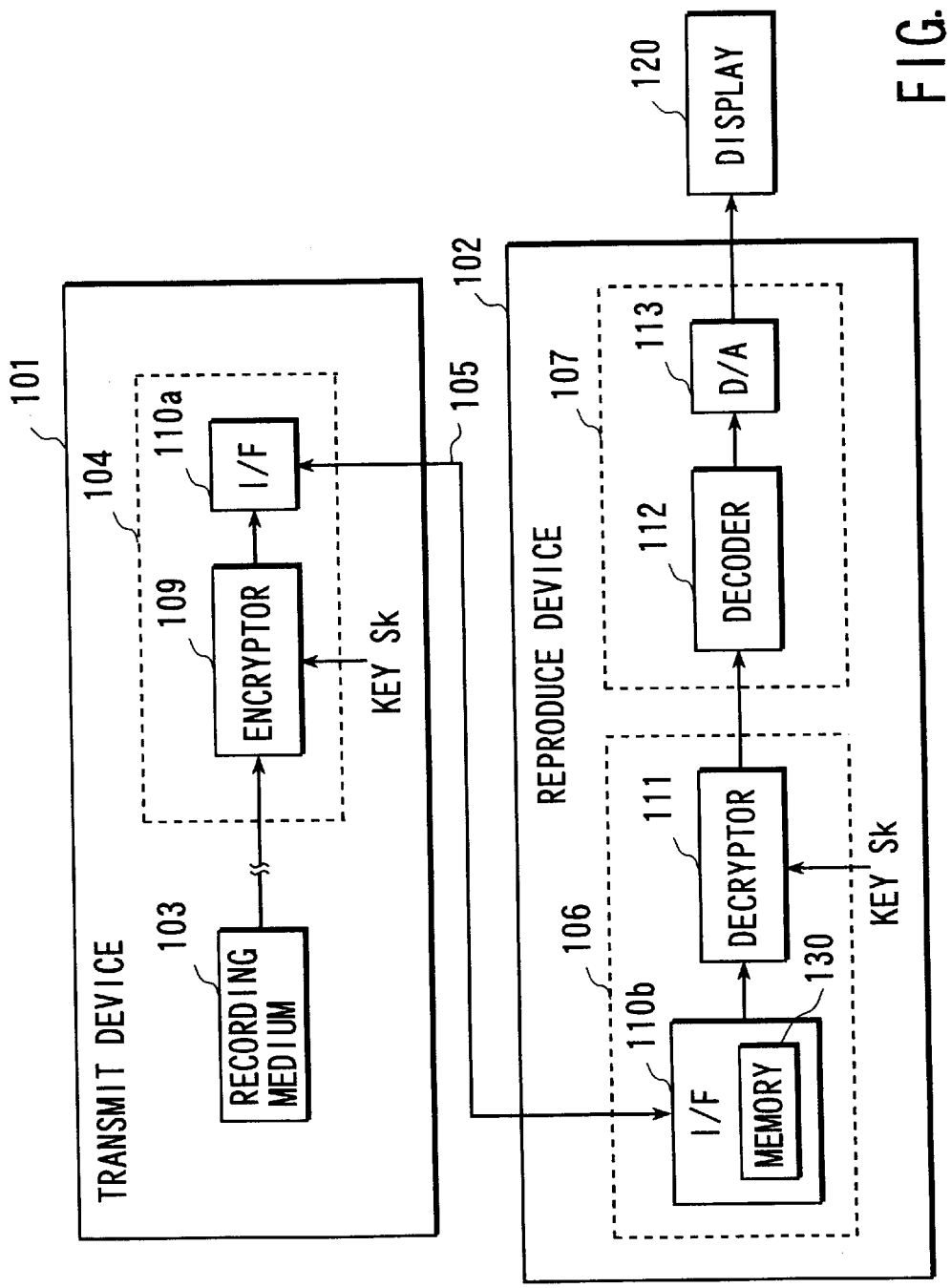
FIG. 1 shows an example of a system configuration of a digital data reproduction device according to a first embodiment of the present invention.

A preferred embodiment of a digital data reproduction device according to the present invention will now be described with reference to the accompanying drawings.
First Embodiment FIG. 1 shows in block diagram form a first embodiment of the present invention. A digital data reproduction device of the first embodiment can assume various modes, such as of reproducing multimedia data, such as video, music, etc., received over a network, a cable line, or a satellite, of reproducing data taken out of a DVD-RAM, a digital VCR, or a CD-ROM, and so on. In any case, the multimedia data is encrypted at some stage and then transferred to the reproduction device where it is decrypted and output in the form of visual display or analog recording. The embodiment will be described herein as using digital image data compression-encoded by MPEG-2 scheme (hereinafter simply called as MPEG2 video data) as multimedia data and the encryption scheme that conforms to the IEEE 1394 standard. However, this is not restrictive. Further, a description will be given of a case where a data transmit device which takes encoded data from a storage medium, such as a DVD-ROM, a digital VCR, a CD-ROM, or the like, and a dedicated AV device or personal computer serving as a data receive device are coupled with each other by an IEEE 1394 cable.

First, the case where a data transmit device that takes MPEG2-compressed data out of a recording medium and a dedicated AV device are coupled will be described with reference to FIG. 1.

A transmit device 101 takes MPEG2 video data, which is an object of reproduction, out of a recording medium 103, such as a DVD-RAM, and sends it to a dedicated AV device 102, which is a receive device, over an IEEE 1394 cable 105. The dedicated AV device 102 reproduces the received video on a display unit 120.

The transmit device 101 is composed of a unit for reading MPEG2 video data from the storage medium 103, such as a DVD-RAM, and a transmit unit 104 serving as the IEEE 1394 interface. The transmit unit 104 comprises an IEEE 1394 encryptor 109 and an IEEE 1394 interface unit (hereinafter called I/F unit) 110a. The encryptor 109 and the I/F unit 110a may be implemented, as shown, in the form of one chip (including one LSI or compound chip); otherwise, they each may be made of a separate chip.

The dedicated AV device 102 is composed of a receive unit 106 as an IEEE 1394 interface and a video processor unit 107 for decoding the MPEG2 video data to reproduce the original image data. Like the transmit unit 104, the receive unit 106 comprises an IEEE 1394 I/F unit 110b and an IEEE 1394 decryptor 111. The I/F unit 110b and the decryptor 111 may be implemented as one chip as shown or may each consist of a separate chip.

The IEEE 1394 I/F unit 110b has a flag memory 130 that stores a flag indicating that it is a legal product made by a qualified manufacturer under contract to the standard committee.

The MPEG2 video data output from the receive unit 106 is input into the video processor 107 where it is expansion-decoded. The video processor 107 comprises an MPEG2 decoder 112 and a digital-to-analog (D/A) converter 113, which may be implemented as one chip as shown or may each consist of a separate chip. Although not shown, the receive unit 106 and the processor unit 107 may be implemented as one chip. The output of the video processor 107 is applied as the output of the dedicated AV device 102 to the display unit 120. Although not shown, the output of the dedicated AV unit 102 may be applied to a recording apparatus such as an analog video cassette recorder (VCR).

Next, the operation of the embodiment of FIG. 1 will be described mainly for encryption and decryption of MPEG2 video data by the IEEE 1394 encryptor 109 and the IEEE 1394 decryptor 111.

First, in the transmit device 101, the MPEG2 video data read from the recording medium 103 is encrypted in the IEEE 1394 encryptor 109 using an encryption key Sk. The encryption system used may be a block encryption system, such as DES or IDEA, a stream encryption system, or a public key encryption system. The present embodiment supposes the use of a common key encryption system in which the encryption and decryption keys are the same. In the case of the public key encryption system, the transmit device 101 accepts a public key from the dedicated AV device 102 and encrypts the MPEG2 video data using that public key. The dedicated AV device 102 will decrypt the encrypted MPEG2 video data from the transmit device 101 using its own secret key.

The MPEG2 video data encrypted in the encryptor 109 is converted into the IEEE 1394-defined format in the IEEE 1394 I/F unit 110*a* and then sent to the dedicated AV device 102 over the IEEE 1394 cable 105.

Before sending the encrypted MPEG2 video data to the IEEE 1394 I/F unit 110*b,* the I/F unit 110*a* checks the I/F unit 110*b* for its validity, i.e., determines whether the I/F unit 110*b* is an authorized one or not. That is, the I/F units 110*a* and 110*b* validate each other before data communication. The I/F unit 110*a* is arranged not to send data to the I/F unit 110*b* when it is found to be an unauthorized IEEE 1394 chip on the basis of the contents of the flag memory 130.

In the dedicated AV device 102, when the MPEG2 encrypted video data is received in the I/F unit 110*b,* the decryptor 111 decrypts the video data using the same key Sk as the encryption key of the encryptor 109 in the transmit device 101 to obtain the MPEG2 video data. The decrypted MPEG2 video data is expansion-decoded in the data decoder 112 in the video processor 107, whereby the original digital video data is reproduced. The original video data is converted by the D/A converter 113 into an analog signal, which is in turn applied to the display unit 120 or a recording device (not shown).

How to share the encryption key Sk through the IEEE 1394 cable 105 will be described next. To share the key, for example, Bus-Key sharing method used in DVD-ROMs may be used.

With this method, challenge key 1 (10 bytes long) is created first in the dedicated AV device 102 using a random number generator or the like and then sent to the transmit device 101. In the transmit device 101, Key 1 (five bytes long) is created on the basis of challenge key 1 and, in the dedicated AV device 102, the identical Key 1 is likewise created using challenge key 1. To create Key 1, a unidirectional function is used. Next, the transmit device 101 creates challenge key 2 (10 bytes long) using a random number generator and sends it to the dedicated AV device 102. The dedicated AV device 102 creates Key 2 (five bytes long) using challenge key 2 sent from the transmit device 101. The transmit device 101 likewise creates the identical Key 2 using challenge key 2. In this manner, the transmit device 101 and the dedicated AV device 102 can share Key 1 and Key 2. Then, Bus-Key is created using Key 1 and Key 2. The use of such a procedure eliminates the need of sending and receiving the encryption key itself over the IEEE 1394 cable 105, ensuring secure key sharing. Moreover, Bus-Key is created using Key 1 and Key 2 that change each time and hence it is one time only that Bus-Key is valid. This will provide increased security.

The dedicated AV device 102, which, unlike a personal computer, has no bus, can be arranged such that the receiving unit 106 includes the decryptor 111 which decrypts the encrypted data and the processor unit 107 includes the decoder 112 which decodes the MPEG2 video data, and the decrypted MPEG2 video data is sent from the decryptor 111 in the receiving unit 106 to the decoder 112 in the processor unit 107.

If the arrangement of FIG. 1 is applied to a personal computer, the decrypted MPEG2 video data will be sent from the decryptor 111 in the receiving unit 106 to the decoder 112 in the processor unit 107 over the bus. Under such a situation, however, MPEG2 video data could freely be taken out of the computer through the bus for copying purposes, making it meaningless to transmit MPEG2 video data in encrypted form over the IEEE 1394 cable 105.

Figure 2:
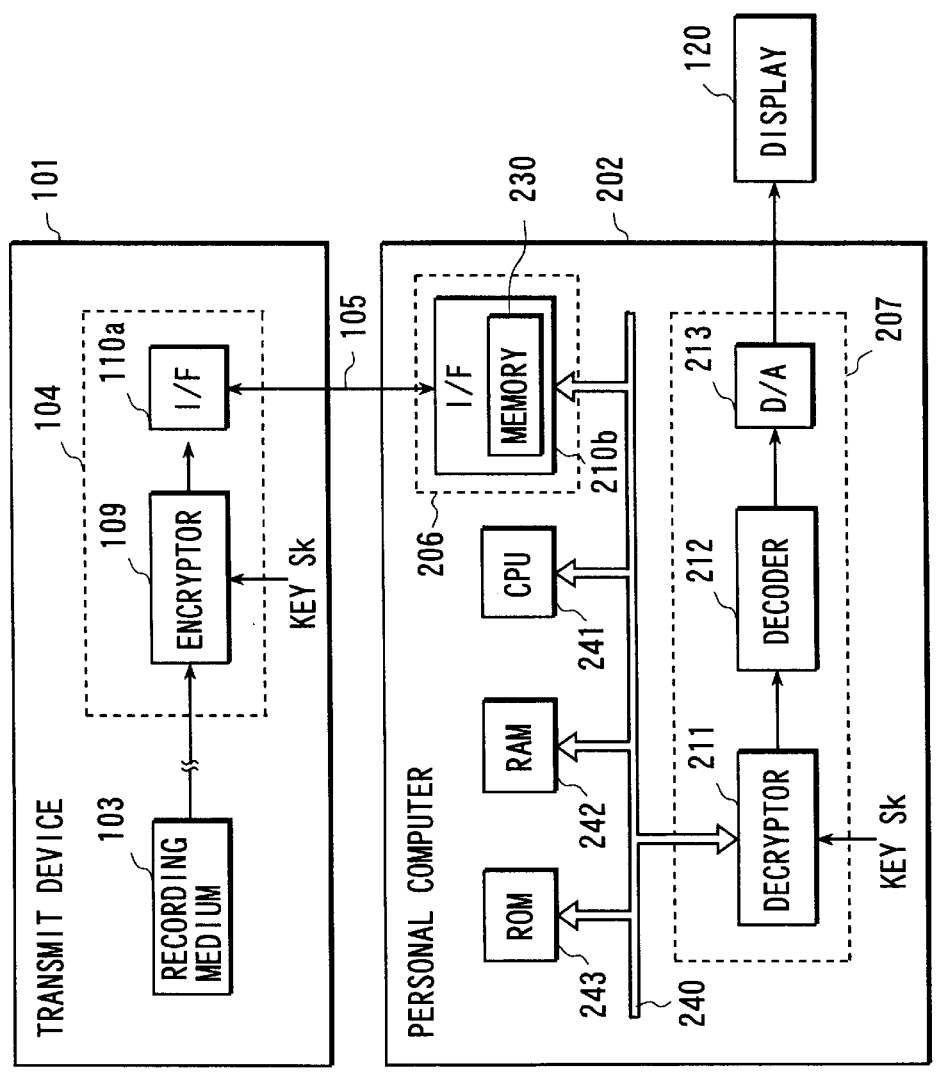
FIG. 2 shows the other example of a system configuration of the digital data reproduction device according to the first embodiment.

Next, a description will be given of the case where a personal computer is used for data reproduction. FIG. 2 shows an arrangement in which a personal computer is connected with a data transmit device which provides encrypted MPEG2 video data.

The transmit device 101 is identical to that shown in FIG. 1.

In the personal computer 202 serving as a receive device, to a bus 240 are coupled a CPU 241, a RAM 242, a ROM 243, an IEEE 1394 interface receiving unit 206, and a processor unit 207 for decoding MPEG2 video data.

The CPU 241 controls the receive device 202, and the RAM 242 and the ROM 243 are used for operations of the CPU 241 and the like.

The receiving unit 206, unlike that of the dedicated AV device 102, consists of only an IEEE 1394 I/F unit 210*b* (i.e., a decryptor is not included) and formed of one chip.

The I/F unit 210*b* has a flag memory 230 that stores a flag indicating that it is an authorized one, i.e., it was made by an authorized manufacturer under contract to the standard committee.

The processor unit 207 comprises an IEEE 1394 decryptor 211, an MPEG2 data decoder 212, and a D/A converter 213. The data decoder 212 and the D/A converter 213 are identical to the data decoder 112 and the D/A converter 113, respectively. The processor unit 207 is implemented as one chip as shown. As is the case with the example of FIG. 1, the decryptor 211 may be implemented as one chip and the data decoder 212 and the D/A converter 213 may be implemented as one chip. In this case as well, it is required to supply the output of the decryptor 211 to the decoder 212 with no use of the bus. The processor unit 207 may be implemented in software, but not in hardware.

The IEEE 1394 decryptor 211, while being identical to the decryptor 111 of FIG. 1 in the function of decrypting encrypted data, is mounted in the processor unit 207, but not in the receiving unit 206.

For encryption in data transmission from the transmit device 201 to the receive device 202, the block encryption, such as DES, IDEA, or the like, the stream encryption or the public key encryption may be used. As in the case of the dedicated AV device 102, in the present embodiment, use is made of the common key encryption system in which the encryption and decryption keys are the same and the previously mentioned key sharing method used in DVD-ROMs for sharing the encryption key.

Next, the operation of the arrangement of FIG. 2 will be described mainly for encryption and description of MPEG2 video data by the IEEE 1394 encryptor 109 and the IEEE 1394 decryptor 211.

First, in the transmit device 101, MPEG2 video data read from the recording medium 103 is encrypted in the IEEE 1394 encryptor 109 using an encryption key Sk. The encryption system used may be a block encryption system, such as DES or IDEA, a stream encryption system, or a public key encryption system. The present embodiment supposes the use of a common key encryption system in which the encryption and decryption keys are the same. In the case of the public key encryption system, the transmit device 101 accepts a public key from the personal computer 202 and then encrypts the video data using that public key. In this case, the personal computer 202 will decrypt the encrypted video data using its own secret key.

The encrypted MPEG2 video data is converted into the IEEE 1394 defined format in the IEEE 1394 I/F unit 110*a* and then sent to the personal computer 202 over the IEEE 1394 cable 105.

Before sending the encrypted MPEG2 video data to the IEEE 1394 I/F unit 210*b,* the sending I/F unit 110*a* determines whether the receiving I/F unit 210*b* is an authorized one or not. That is, the I/F units 110*a* and 210*b* check each other for their validity before data communication. The I/F unit 110*a* is arranged not to send data to the I/F unit 210*b* when it is found to be an unauthorized IEEE 1394 interface chip on the basis of the contents of the flag memory 130.

In the personal computer 202, the encrypted MPEG2 video data is received in the I/F unit 210*b* and then sent to the processor unit 207 over the bus 240 as it is. In the processor unit 207, the encrypted MPEG2 video data is decrypted in the IEEE 1394 decryptor 211 using the same encryption key Sk as the encryption key Sk for the transmit unit 104 to yield the MPEG2 video data. The decrypted MPEG2 video data is then decoded in the data decoder 212 to yield the original video data. The original video data is converted by the D/A converter 213 into an analog video signal, which, in turn, is applied to the display unit 120 for display.

Thus, unlike the dedicated AV device 102, in the case of the personal computer 202, since the receive unit 206 has no decryptor, the decrypted MPEG2 video data is not transferred over the bus 240, preventing illegal copying of MPEG2 video data.

Even with this arrangement, it is not entirely impossible for malicious ones to make copies illegally. That is, if the receive unit 206 in the personal computer 202 were removed and the receive unit 106 adapted for the dedicated AV device 102 were mounted instead, decrypted MPEG2 video data would be transferred over the bus 240. In order to cope with such a situation, it is recommended that the chip configuration of the receive unit be made to differ between the dedicated AV device 102 and the personal computer 202 as shown in FIG. 3. This will make chip replacement impossible. The left-hand portion of FIG. 3 shows chip configurations of the receive unit 106 of the dedicated AV device 102, while the right-hand portion shows chip configurations of the receive unit 206 of the personal computer 202.

Thus, by making the chip configuration, such as the number of pins, the size and shape of the chip body, etc., different between the dedicated AV device 102 and the personal computer 202, chip replacement can be prevented with certainty.

As described above, according to the digital reproduction device of the first embodiment, since the decrypted MPEG2 data is not transferred over the bus, it can be made impossible to take the MPEG2 data out of the computer, thus preventing illegal copying.

Another embodiment of the present invention will be described next. In the following embodiment, like reference numerals are used to denote corresponding parts to those in the first embodiment and their descriptions are omitted.

Second Embodiment

Although, in the first embodiment, the chip configuration was changed to prevent chip replacement, in the second embodiment internal processing codes used in the receive unit (i.e., the chip) are made different between the dedicated AV device 102 and the personal computer 202 to thereby make chip replacement substantially impossible.

Specifically, the allocation of in-chip control command codes, for example, ASCII codes, is made different between the dedicated AV device 102 and the personal computer 202.

Thus, not only the difference in chip configuration but also the difference in internal processing commands can achieve non-interchangeability of the receive units, or chips. Even if chip replacement is made, external inputs will provide different internal processing because of the difference in control command allocation, resulting in failure to operate properly.

In addition, when the chips each have a CPU built in, different programming languages, for example, Z80 and C, can be used to provide the same effect as when different internal command codes are used.

Third Embodiment

In the third embodiment, the chip is provided with a device identifying pin that identifies which of the dedicated AV device 102 and the personal computer 202 it is mounted in, thereby making chip replacement substantially impossible.

Specifically, one of pins of an LSI chip is used as the device identifying pin and, on the basis of a signal input at that pin, a decision is made as to which of the dedicated AV device 102 and the personal computer 202 the chip is mounted in. The receive unit 106 for the dedicated AV unit 102 is arranged to operate properly only when it is mounted in the dedicated AV device 102, and the receive unit 206 for the personal computer 202 is arranged to operate properly only when it is mounted in the personal computer 202.

In the personal computer 202, for example, the location to which the device identifying pin of the receive unit 206 is connected is made a dummy and no signal is applied to that pin. In the dedicated AV unit 102, on the other hand, a predetermined signal is applied to the device identifying pin.

Therefore, the chip can identify the device in which it is mounted on the basis of whether the predetermined input is applied to its device identifying pin or not.

Of course, it is also possible to apply the signal to the device identifying pin of the personal computer as opposed to the dedicated AV unit. Also, other modifications are possible. For example, the device identifying pins of the personal computer and the dedicated AV device may be supplied with signals at different levels such as a HIGH level and a LOW level.

Additionally, it is advisable to vary the location of the device identifying pin between the personal computer and the dedicated AV device.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, although the embodiments of the present invention have been described in reference to data transmission between a DVD reproduce device and a receive device, such as a dedicated AV device or personal computer, the present invention is not limited to such an application. For example, the principles of the present invention can be applied to data transmissions over a network or via a satellite. For example, to receive encrypted MPEG2 video data from a satellite, a set top box (STB) will be provided which corresponds to the transmit device 101. In this case, the data transmission based on IEEE 1394 standard from the set top box to the dedicated AV device or the personal computer can be considered to be same as that in the embodiments.

Moreover, the present invention can be applied to a case where the dedicated AV device or the personal computer located on the user side is connected to the transmit device 101 through a network.

Furthermore, although the type of data has been described in terms of MPEG2 video data, the compression-encoding is not essential to the present invention. The present invention is also applicable to a case where original data is transmitted in encrypted form without compression-coding.

According to the present invention, even in the case where both the dedicated AV device and the personal computer are available and encrypted data is sent to each of the dedicated AV device and the personal computer, unauthorized copying of data can be prevented because the configuration of the receive unit of the personal computer is made different from that of the AV unit so that data after decryption does not appear on the bus.

What is claimed is:

1. A digital data reproduction device having a CPU and a CPU bus, the device comprising:
   receive means to which a first semiconductor chip for receiving encrypted and coded data is attached; and
   processor means, connected to said semiconductor chip via the CPU bus, for decrypting and decoding the encrypted and coded data output from said first semiconductor chip;
   wherein said receive means includes countermeasure means for preventing a second semiconductor chip, having means for receiving the encrypted and coded data and means for decrypting and decoding the encrypted and coded data, from being attached to the receive means as a substitute for the first semiconductor chip.

2. The device according to claim 1, wherein said countermeasure means comprises a first number of contact positions for attaching the first semiconductor chip that differs from a second number of contact positions for attaching the second semiconductor chip.

3. The device according to claim 1, wherein said countermeasure means comprises a first size connector for attaching the first semiconductor chip that differs from a second size connector for attaching the second semiconductor chip.

4. The device according to claim 1, wherein said countermeasure means comprises a connector having a first shape for attaching the first semiconductor chip that differs from a connector having a second shape for attaching the second semiconductor chip.

5. A digital data reproduction device having a CPU and a bus, the device comprising:
   receive means to which a first semiconductor chip for receiving encrypted and coded data is attached, said first semiconductor chip having countermeasure means for preventing a second semiconductor chip from operating when a second reproduction device is attached to the receive means as a substitute for the first semiconductor chip, wherein the second semiconductor chip includes means for receiving the encrypted and coded data and means for decrypting and decoding the encrypted and coded data; and
   processor means, connected to said first semiconductor chip via the CPU bus, for decrypting and decoding encrypted and coded data output from said first semiconductor chip.

6. The device according to claim 5, wherein said countermeasure means comprises a first internal processing code for processing the encrypted and coded data that differs from a second internal processing code used by the second semiconductor chip for processing the encrypted and coded data.

7. The device according to claim 5, wherein said countermeasure means comprises a first programming language that differs from a second programming language used by the second semiconductor chip.

8. The device according to claim 5, wherein said countermeasure means comprises:
   determining means for whether said reproduction device is attached in place of the semiconductor chip; and
   inhibiting means for inhibiting an operation when it is determined that said second semiconductor chip is attached.

9. The device according to claim 8, wherein said determining means further comprises:
   measuring means for measuring a signal from said receive means; and
   analyzing means for analyzing the signal to determine whether said second reproduction device is attached in place of the semiconductor chip.

10. A digital data reproduction device having a CPU and a CPU bus, the device comprising:
    receive means to which a first semiconductor chip for receiving encrypted and coded data is attached, said receive means including an identifying contact position and a signal generator for applying a signal to the identifying contact position identifying device,
    wherein the first semiconductor chip operates properly when it receives the signal, and a second semiconductor chip, having means for receiving the encrypted and coded data and means for decrypting and decoding the encrypted and coded data, does not operate properly when the second semiconductor chip is attached to the receive means as a substitute for the semiconductor chip and receives the signal; and
    processor means, connected to said semiconductor chip via the CPU bus, for decrypting and decoding encrypted and coded data output from said first semiconductor chip.

11. A digital data reproduction device comprising:
    a first semiconductor chip, adapted to be connected to a computer, and configured to receive the encrypted and coded data; and
    the computer comprising a CPU, a CPU bus, a second semiconductor chip, connected to said first semiconductor chip via the CPU bus, configured to decrypt and decode the encrypted and coded data supplied from said first semiconductor chip via the CPU bus, and a connection means for preventing the decrypted and decoded dta from traveling over the CPU bus when the data is transferred from the second semiconductor chip to an output terminal.

12. A digital data reproduction device comprising:
    a first semiconductor chip, connected to a bus of a computer, configured to receive encrypted and coded data, and comprising an interface to receive the encrypted and encoded data from an external data source and to supply the received data to the bus after converting a data format; and
    a second semiconductor chip connected to said first semiconductor chip via the bus, configured to decrypt and decode the encrypted and coded data supplied from said first semiconductor chip; and
    a countermeasure means for preventing a third semiconductor chip, configured to receive encrypted and coded data and means for decrypting and decoding the encrypted and coded data, from being attached to the bus of the computer as a substitute for the first semiconductor chip.

13. The device according to claim 12, wherein said external data source includes a data reproduction device for reproducing coded data and an encryptor for encrypting reproduced coded data to output the encrypted and coded data.

14. The device according to claim 13, wherein said data reproduction device reproduces the coded data from a recording medium.

15. The device according to claim 13, wherein said first semiconductor chip is connected to the data source via an IEEE 1394 interface.

16. The device according to claim 12, wherein said second semiconductor chip is connected to a display.

17. The device according to claim 12, wherein said second semiconductor chip comprises a decryptor for decrypting the encrypted and coded data supplied from said first semiconductor chip and a decoder for decoding encrypted and coded data supplied from said decryptor.

18. The device according to claim 12, wherein said external data source outputs data with a data format according to IEEE 1394 standard.

* * * * *

UNITED STATES PATENT AND TRADEMARK OFFICE
CERTIFICATE OF CORRECTION

PATENT NO. : 6,751,321 B1
DATED : June 15, 2004
INVENTOR(S) : Kato et al.

It is certified that error appears in the above-identified patent and that said Letters Patent is hereby corrected as shown below:

<u>Column 10,</u>
Line 45, change "dta" to -- data --.

Signed and Sealed this

Seventeenth Day of August, 2004

JON W. DUDAS
*Acting Director of the United States Patent and Trademark Office*